(12) United States Patent
Urano

(10) Patent No.: US 10,839,678 B2
(45) Date of Patent: Nov. 17, 2020

(54) VEHICLE IDENTIFYING DEVICE

(71) Applicant: TOYOTA JIDOSHA KABUSHIKI KAISHA, Toyota (JP)

(72) Inventor: Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/938,106

(22) Filed: Mar. 28, 2018

(65) Prior Publication Data

US 2018/0286222 A1 Oct. 4, 2018

(30) Foreign Application Priority Data

Apr. 4, 2017 (JP) .................. 2017-074701

(51) Int. Cl.
*G08G 1/017* (2006.01)
*B60W 40/09* (2012.01)
*G08G 1/015* (2006.01)

(52) U.S. Cl.
CPC ............. *G08G 1/017* (2013.01); *B60W 40/09* (2013.01); *G08G 1/015* (2013.01); *B60W 2554/80* (2020.02); *B60W 2555/60* (2020.02); *B60W 2556/45* (2020.02)

(58) Field of Classification Search
CPC .......... G05D 1/0061; G05D 1/021; G05D 2201/0213; B60K 35/00; B60K 37/06; B60K 2350/1028; B60W 10/06; B60W 10/18; B60W 10/20; B60W 30/12; B60W 30/143; B60W 30/16; B60W 30/18154; B60W 30/18163; B60W 40/09; B60W 50/14; B60W 2050/007; B60W 2050/0089; B60W 2050/146; B60W 2520/10; B60W 2540/04; B60W 2540/30; B60W 2550/14; B60W 2550/20; B60W 2720/10; B60W 2720/106; B60W 2750/308; G08G 1/16

See application file for complete search history.

(56) References Cited

U.S. PATENT DOCUMENTS

| | | | | |
|---|---|---|---|---|
| 9,720,415 | B2* | 8/2017 | Levinson | ................ G01S 13/86 |
| 10,664,918 | B1* | 5/2020 | Slusar | .................. G07C 5/0841 |
| 2009/0276135 | A1* | 11/2009 | Hagemann | ............ B60W 30/16 |
| | | | | 701/96 |
| 2015/0149019 | A1* | 5/2015 | Pilutti | ............. G08G 1/096741 |
| | | | | 701/23 |

(Continued)

FOREIGN PATENT DOCUMENTS

| | | |
|---|---|---|
| JP | 2002-225587 A | 8/2002 |
| JP | 2016-131365 A | 7/2016 |
| JP | 2017-030748 A | 2/2017 |

*Primary Examiner* — Hai Phan
*Assistant Examiner* — Anthony D Afrifa-Kyei
(74) *Attorney, Agent, or Firm* — Sughrue Mion, PLLC

(57) ABSTRACT

A vehicle identifying device is configured to identify a target vehicle around a vehicle. The vehicle identifying device includes circuitry configured to: acquire a behavior of the target vehicle based on a detection result of an external sensor; estimate a behavior of the target vehicle in a case where the target vehicle is an automatically driven vehicle based on map information; and identify whether the target vehicle is the automatically driven vehicle based on a result of comparison between the acquired behavior of the target vehicle and the estimated behavior.

2 Claims, 4 Drawing Sheets

(56) References Cited

U.S. PATENT DOCUMENTS

| | | | | |
|---|---|---|---|---|
| 2016/0357188 A1* | 12/2016 | Ansari | ............... | G06K 9/00805 |
| 2017/0153639 A1* | 6/2017 | Stein | ................... | G08G 1/09623 |
| 2017/0305434 A1* | 10/2017 | Ratnasingam | ........ | B60W 40/09 |
| 2018/0292833 A1* | 10/2018 | You | ..................... | B60W 30/182 |
| 2019/0113927 A1* | 4/2019 | Englard | ............. | G01C 21/3492 |

* cited by examiner

VEHICLE IDENTIFYING DEVICE

INCORPORATION BY REFERENCE

The disclosure of Japanese Patent Application No. 2017-074701 filed on Apr. 4, 2017 including the specification, drawings and abstract is incorporated herein by reference in its entirety.

BACKGROUND

1. Technical Field

The present disclosure relates to a vehicle identifying device.

2. Description of Related Art

Japanese Unexamined Patent Application Publication No. 2002-225587 (JP 2002-225587 A) discloses a device including a preceding-vehicle automatic driving determining unit. This device determines that a preceding vehicle is a manually driven vehicle when an inter-vehicle distance between a vehicle and a vehicle preceding the vehicle changes greatly, and determines that a preceding vehicle is an automatically driven vehicle when an inter-vehicle distance between a vehicle and a vehicle preceding the vehicle changes little.

SUMMARY

However, since there is a likelihood that a pattern of change of an inter-vehicle distance will vary depending on situations, it cannot be said that this will allow accurate determination of whether a target vehicle such as a preceding vehicle is an automatically driven vehicle in all situations. In order to cope with various situations, there is demand for a device that identifies whether a target vehicle is an automatically driven vehicle using a parameter other than the inter-vehicle distance.

An aspect of the disclosure provides a vehicle identifying device configured to identify a target vehicle around a vehicle. The vehicle identifying device according to the aspect includes circuitry configured to: acquire a behavior of the target vehicle based on a detection result of an external sensor; estimate a behavior of the target vehicle in a case where the target vehicle is an automatically driven vehicle based on map information; and identify whether the target vehicle is the automatically driven vehicle based on a result of comparison between the acquired behavior of the target vehicle and the estimated behavior.

In this device, a behavior of a target vehicle is acquired based on detection results from external sensors and a behavior of the target vehicle in a case where the target vehicle is an automatically driven vehicle is estimated based on map information. It is identified whether the target vehicle is an automatically driven vehicle based on a result of comparison between the behavior of the target vehicle and the estimated behavior. In this way, the device can identify whether the target vehicle is an automatically driven vehicle based on the result of comparison between the measured behavior of the target vehicle and the behavior of an automatically driven vehicle estimated based on map information. Accordingly, the device can identify that the target vehicle is an automatically driven vehicle using a parameter other than an inter-vehicle distance.

In the above aspect, the map information may include past map information, and the circuitry may be configured to: estimate the behavior of the target vehicle in the case where the target vehicle is the automatically driven vehicle based on the past map information; and identify that the target vehicle is the automatically driven vehicle when it is determined that the acquired behavior of the target vehicle and the behavior estimated based on the past map information match each other.

Map information may not reflect actual roads or traffic rules depending on updating times. Accordingly, an automatically driven vehicle is likely to exhibit a behavior that is not appropriate in view of actual map information but is appropriate in view of past map information. The device can identify that the target vehicle is an automatically driven vehicle using past map information.

In the above aspect, the map information may include traffic rules, and the circuitry may be configured to: estimate the behavior of the target vehicle in the case where the target vehicle is the automatically driven vehicle based on the traffic rules; and identify that the target vehicle is the automatically driven vehicle when it is determined that the acquired behavior of the target vehicle and the behavior estimated based on the traffic rules match each other.

An automatically driven vehicle is likely to exhibit a behavior of faithfully observing traffic rules. Accordingly, the device can identify that a target vehicle is an automatically driven vehicle using traffic rules.

In the above aspect, the circuitry may be configured to identify that the target vehicle is the automatically driven vehicle when it is determined that change of an acceleration over time in a relative direction between the target vehicle and each of objects estimated to be recognizable by the target vehicle varies discontinuously depending on a change of the number of the objects.

In general, an automatically driven vehicle moves at a distance from objects and is thus likely to exhibit discontinuous movement when the number of neighboring objects changes. Accordingly, the device can identify that a target vehicle is an automatically driven vehicle using the number of objects and the change of an acceleration in a relative direction over time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, exemplary embodiments of the disclosure will be described with reference to the accompanying drawings. In the following description, the same or corresponding elements will be referenced by the same reference signs and description thereof will not be repeated.

First Embodiment (Configuration of Automatic Driving System)

Figure 1:
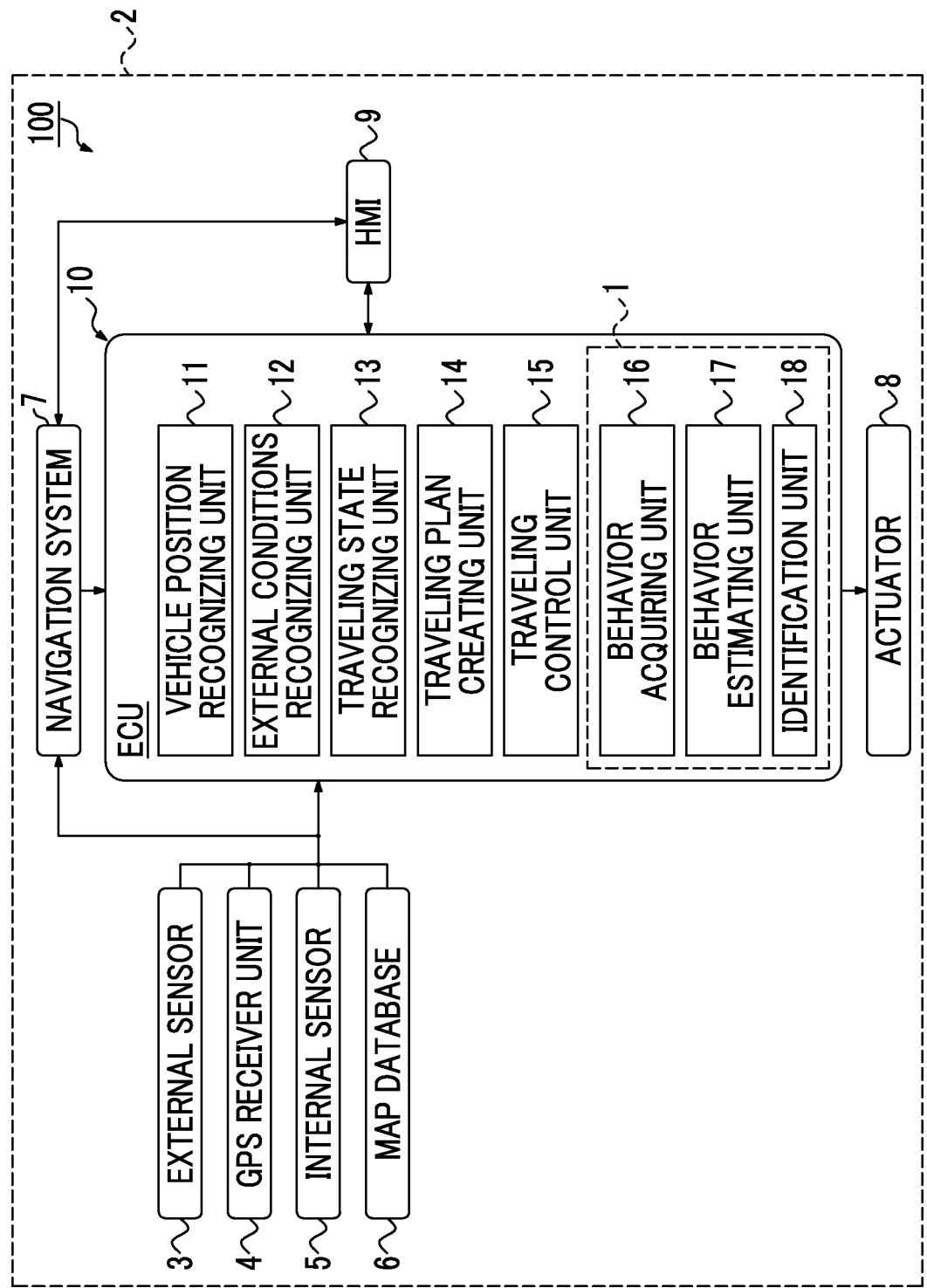
FIG. 1 is a block diagram illustrating an example of a configuration of a vehicle including a vehicle identifying device according to an embodiment.

FIG. 1 is a block diagram illustrating an example of a configuration of a vehicle 2 including a vehicle identifying device 1 according to an embodiment. As illustrated in FIG. 1, a vehicle 2 such as an automobile is provided with an automatic driving system 100. The vehicle identifying device 1 constitutes a part of the automatic driving system 100.

The vehicle identifying device 1 identifies a target vehicle around the vehicle 2. A target vehicle refers to a vehicle which is to be identified. Examples of a target vehicle include a preceding vehicle, a following vehicle, and a vehicle adjacent to the vehicle 2. The vehicle identifying device 1 identifies whether a target vehicle is an automatically driven vehicle. Details of the vehicle identifying device 1 will be described later.

The automatic driving system 100 performs automatic driving of the vehicle 2. Automatic driving is vehicle control of causing the vehicle 2 to travel automatically to a preset destination. A destination may be set by an occupant such as a driver or may be automatically set by the automatic driving system 100. In automatic driving, a driver does not need to perform a driving operation and the vehicle 2 travels automatically.

The automatic driving system 100 includes an external sensor 3, a GPS receiver unit 4, an internal sensor 5, a map database 6, a navigation system 7, an actuator 8, a human-machine interface (HMI) 9, and an electronic control unit (ECU) 10. The ECU is an electronic control unit including a central processing unit (CPU), a read only memory (ROM), a random access memory (RAM), and a controller area network (CAN) communication circuit.

The external sensor 3 is a detection device that detects surrounding conditions of the vehicle 2. The external sensors 3 include at least one of a camera and a radar sensor. The camera is an imaging device that images external conditions of the vehicle 2. The camera is provided, for example, on the back of a front windshield of the vehicle 2. The camera may be a monocular camera or may be a stereoscopic camera. A stereoscopic camera includes two imaging units that are arranged to reproduce binocular parallax. Imaging information of the stereoscopic camera also includes information in a depth direction.

The radar sensor is a detection device that detects objects around the vehicle 2 using radio waves (for example, radio waves of 1 millimeter to 10 millimeters) or light. The radar sensor detects an object by transmitting radio waves or light to the surroundings of the vehicle 2 and receiving radio waves or light reflected from the object. The radar sensors include, for example, at least one of a millimeter wave radar and a light detection and ranging (LIDAR).

External sensors 3 may be provided for each of detection objects. For example, the external sensor 3 may include a sensor that detects an object and a dedicated sensor that is provided for detect a specific object. The dedicated sensor is, for example, a camera that detects traffic lights. In this case, traffic lights and signal states are detected by template matching using color information (for example, luminance) of an image and/or a shape of an image (for example, using the Hough transform) acquired from a camera. In order to improve an accuracy of detecting traffic lights, map information which will be described later may be used.

The GPS receiver unit 4 measures a position of the vehicle 2 (for example, latitude and longitude of the vehicle 2) by receiving signals from three or more GPS satellites.

The internal sensor 5 is a detection device that detects a traveling state of the vehicle 2. The internal sensor 5 includes a vehicle speed sensor, an acceleration sensor, and a yaw rate sensor. The vehicle speed sensor is a detector that detects a speed of the vehicle 2. For example, a wheel speed sensor that is disposed for wheels of the vehicle 2 or a drive shaft rotating integrally with the vehicle wheels and that detects a rotation speed of the vehicle wheels may be used as the vehicle speed sensor.

The acceleration sensor is a detector that detects an acceleration of the vehicle 2. The acceleration sensor may include a longitudinal acceleration sensor that detects an acceleration in a longitudinal direction of the vehicle 2 and a lateral acceleration sensor that detects an acceleration in a lateral direction of the vehicle 2. The yaw rate sensor is a detector that detects a yaw rate (a rotational acceleration) around a vertical axis of the center of gravity of the vehicle 2. For example, a gyro sensor can be used as the yaw rate sensor.

The map database 6 is a storage that stores map information. The map database 6 may be stored, for example, in a hard disk drive (HDD) mounted in the vehicle 2. The map database 6 includes map information. Map information is a map including information on positions and roads and includes, for example, position information of roads, information of road shapes (a type such as a curve or a straight line, a curvature of a curve, and the like), and information of crossings and junctions. The map information may include traffic rules correlated with the position information on a map. The traffic rules include speed limits, acceleration limits, and positions of stop lines.

The navigation system 7 is a system that performs guiding of a driver of the vehicle 2 to a preset destination. The navigation system 7 calculates a route on which the vehicle 2 travels based on the position of the vehicle 2 measured by the GPS receiver unit 4 and the map information of the map database 6. The navigation system 7 performs guiding of a driver on a route by display on a display unit and output of speech from a sound transmitting unit using the HMI 9 which will be described later.

The actuator 8 is a device that is used to control the vehicle 2. The actuator 8 includes at least a throttle actuator, a brake actuator, and a steering actuator.

The throttle actuator controls a driving force of the vehicle 2 by controlling an amount of air (an throttle opening degree) supplied to an engine in accordance with a control signal from the ECU 10 which will be described later. When the vehicle 2 is a hybrid vehicle, a control signal from the ECU 10 in addition to the amount of air supplied to the engine is input to a motor as a power source and the driving force of the vehicle 2 is controlled. When the vehicle 2 is an electric vehicle, a control signal from the ECU 10 is input to a motor (a motor serving as an engine) as a power source and the driving force of the vehicle 2 is controlled. In this case, the motor as a power source constitutes the actuator 8.

The brake actuator controls a brake system in accordance with a control signal from the ECU 10 and controls a braking force which is applied to the wheels of the vehicle 2. For example, a hydraulic brake system can be used as the brake system.

The HMI 9 is an interface that inputs and outputs information between the automatic driving system 100 and an occupant. The HMI 9 includes, for example, a display and a speaker. The HMI 9 performs output of an image from the display and output of speech from the speaker in accordance with a control signal from the ECU 10. The display may be a head-up display. The HMI 9 includes an input device (such as a button, a touch panel, a speech input device) that receives an input from an occupant.

The ECU 10 is hardware that comprehensively manages the automatic driving system 100 and is a computing device. For example, the ECU 10 may be connected to a communication network using a CAN communication circuit and is connected to elements of the vehicle 2 to communicate therewith. That is, the ECU 10 can refer to the measurement results of the GPS receiver unit 4, the detection results of the external sensor 3 and the internal sensor 5, and the map information in the map database 6. The ECU 10 can refer to information input to the HMI 9. The ECU 10 can output signals to the HMI 9 and the actuator 8.

The ECU 10 embodies the functions of automatic driving which will be described later by loading a program stored in the ROM into the RAM and causing the CPU to execute the program loaded into the RAM. The ECU 10 may include a plurality of ECUs.

The ECU 10 includes, for example, a vehicle position recognizing unit 11, an external conditions recognizing unit 12, a traveling state recognizing unit 13, a traveling plan creating unit 14, a traveling control unit 15, a behavior acquiring unit 16 (an example of an acquisition unit), a behavior estimating unit 17 (an example of an estimation unit), and an identification unit 18. The vehicle identifying device 1 includes the behavior acquiring unit 16, the behavior estimating unit 17, and the identification unit 18.

The vehicle position recognizing unit 11 recognizes a position of the vehicle 2 on a map. For example, the vehicle position recognizing unit 11 may recognize the position of the vehicle 2 on a map (estimates a vehicle position: localization) based on position information of the vehicle 2 received from the GPS receiver unit 4 and map information of the map database 6. The vehicle position recognizing unit 11 may recognize the position of the vehicle 2 by SLAM technology using localization information of the map database 6 and the detection results of the external sensor 3. The vehicle position recognizing unit 11 may recognize the position of the vehicle 2 on the map using known techniques. When the position of the vehicle 2 can be measured by a sensor provided outside such as on a road, the vehicle position recognizing unit 11 may recognize the position of the vehicle 2 by communication with the sensor.

The external conditions recognizing unit 12 recognizes external conditions of the vehicle 2. The external conditions recognizing unit 12 recognizes objects (which include positions and speeds of the objects) surrounding the vehicle 2, for example, based on the detection results of the external sensor 3 and the map information of the map database 6. When the map information includes ground surface information, the external conditions recognizing unit 12 detects an object based on a deviation from the ground. The external conditions recognizing unit 12 may apply a ground estimation model to the detection results of the external sensor 3 and detect an object based on the deviation from the ground. The external conditions recognizing unit 12 may recognize an object using other known techniques. Examples of an object include mobile objects such as a pedestrian, a bicycle, and other vehicles in addition to immobile fixed objects such as electric poles, guardrails, trees, buildings, and boundary lines of a lane in which the vehicle 2 is traveling. The external conditions recognizing unit 12 recognizes an object, for example, when the detection results are acquired from the external sensor 3.

The traveling state recognizing unit 13 recognizes a traveling state of the vehicle 2 based on the detection results of the internal sensor 5 (for example, vehicle speed information from the vehicle speed sensor, acceleration information from the acceleration sensor, and yaw rate information from the yaw rate sensor). The traveling state of the vehicle 2 includes the vehicle speed, the acceleration, and the yaw rate.

The traveling plan creating unit 14 creates a course of the vehicle 2. The traveling plan creating unit 14 creates a course of the vehicle 2, for example, based on the detection results of the external sensor 3, the map information of the map database 6, the position of the vehicle 2 on the map recognized by the vehicle position recognizing unit 11, information of an object (which includes a boundary line) recognized by the external conditions recognizing unit 12, and the traveling state of the vehicle 2 recognized by the traveling state recognizing unit 13. The traveling plan creating unit 14 may determine a course of the vehicle 2 also using a route calculated by the navigation system 7.

The traveling plan creating unit 14 creates a traveling plan corresponding to the course. The traveling plan creating unit 14 creates a traveling plan corresponding to the course of the vehicle 2, for example, based on the detection results from the external sensor 3 and the map information of the map database 6.

The traveling plan creating unit 14 outputs the created traveling plan such that the course of the vehicle 2 includes sets of two elements such as a target position p in a coordinate system fixed to the vehicle 2 and a speed V at each target point, that is, a plurality of configuration coordinates (p, V). Here, each target position p includes at least positions of an x coordinate and a y coordinate in the coordinate system fixed to the vehicle 2 or information equivalent thereto. The traveling plan is not particularly limited as long as it describes a behavior of the vehicle 2. The traveling plan may use a target time t instead of the speed V or a target time t and a direction of the vehicle 2 at that time point may be added thereto. The traveling plan may be data indicating change of a vehicle speed, an acceleration/deceleration, and a steering torque, and the like of the vehicle 2 when the vehicle 2 is traveling along the course. The traveling plan may include a speed pattern, an acceleration/deceleration pattern, and a steering pattern of the vehicle 2. The traveling plan creating unit 14 may create a traveling plan such that a traveling time (a time required for the vehicle 2 to arrive at a destination) is minimized.

The traveling control unit 15 automatically controls traveling of the vehicle 2 based on the created traveling plan. The traveling control unit 15 outputs a control signal corresponding to the traveling plan to the actuator 8. Accordingly, the traveling control unit 15 controls traveling of the vehicle 2 such that the vehicle 2 travels automatically in accordance with the traveling plan. The traveling control unit 15 can perform automatic driving of the vehicle 2 using known techniques.

The behavior acquiring unit 16 acquires a behavior of a target vehicle based on the detection results of the external sensor 3. The behavior of a target vehicle is an action of a target vehicle and is an action such as at what speed the vehicle travels, whether the vehicle stops at a stop line, or whether the vehicle turns to right or left. Such a behavior can be expressed by information on driving such as an acceleration time, a deceleration time, a course, a speed, an acceleration, and an ON time of a direction indicator.

The behavior estimating unit 17 estimates a behavior of the target vehicle in a case where the target vehicle is an automatically driven vehicle based on map information. The behavior estimating unit 17 estimates the behavior on the premise that the target vehicle moves based on the map information when it is an automatically driven vehicle. For example, the behavior estimating unit 17 estimates the behavior of the target vehicle in a case where the target vehicle is an automatically driven vehicle on the premise that an automatically driven vehicle avoids interference with an object, observes traffic rules, and travels along a road shape. For example, the behavior estimating unit 17 considers the object vehicle as the vehicle 2 and causes the traveling plan creating unit 14 to create a traveling plan of the object vehicle. Then, the behavior estimating unit 17 estimates the behavior of the target vehicle in a case where the object vehicle is an automatically driven vehicle based on the traveling plan of the object vehicle.

The behavior estimating unit 17 uses, for example, past map information. The map information includes past map information. Past map information is map information before being updated or map information of which a part has not been updated and includes information different from an actual road environment. The behavior estimating unit 17 estimates the behavior of the target vehicle in a case where the object vehicle is an automatically driven vehicle based on the past map information.

The identification unit 18 identifies whether the object vehicle is an automatically driven vehicle based on a result of comparison between the behavior of the object vehicle acquired by the behavior acquiring unit 16 and the behavior estimated by the behavior estimating unit 17. For example, when the behavior is appropriate in a past map but is not appropriate on a current map, the identification unit 18 determines that the object vehicle is an automatically driven vehicle. Examples of the "behavior which is appropriate in a past map but is not appropriate on a current map" include a case in which the object vehicle stops at a position of a past stop line and a case in which the object vehicle is going to turn at a past crossing. Such a behavior is a behavior unique to an automatically driven vehicle.

When it is determined that the behavior of the object vehicle acquired by the behavior acquiring unit 16 and the behavior estimated based on the past map information by the behavior estimating unit 17 match each other, the identification unit 18 identifies that the object vehicle is an automatically driven vehicle. The identification unit 18 may identify that the object vehicle is an automatically driven vehicle by comparing behavior elements such as right turn, left turn or stopping, or may identify that the object vehicle is an automatically driven vehicle by comparing more detailed elements.

For example, the identification unit 18 may calculate a degree of matching by comparing information on driving such as an acceleration time, a deceleration time, a course, a speed, an acceleration, and an ON time of a direction indicator as an example of the comparison of behavior. The degree of matching is, for example, an index indicating that there are more similarities as it has a larger value. Then, the identification unit 18 may identify whether the object vehicle is an automatically driven vehicle based on the degree of matching. For example, when the degree of matching is equal to or greater than a predetermined value, the identification unit 18 can determine that the behavior of the object vehicle acquired by the behavior acquiring unit 16 and the behavior estimated based on the past map information by the behavior estimating unit 17 match each other. That is, matching includes a case in which the degree of matching is equal to or greater than a predetermined value as well as a case in which both match each other perfectly. The identification unit 18 may output the identification result to the HMI 9 or may be used for automatic driving.

(Operation of Vehicle Identifying Device)

Figure 2:
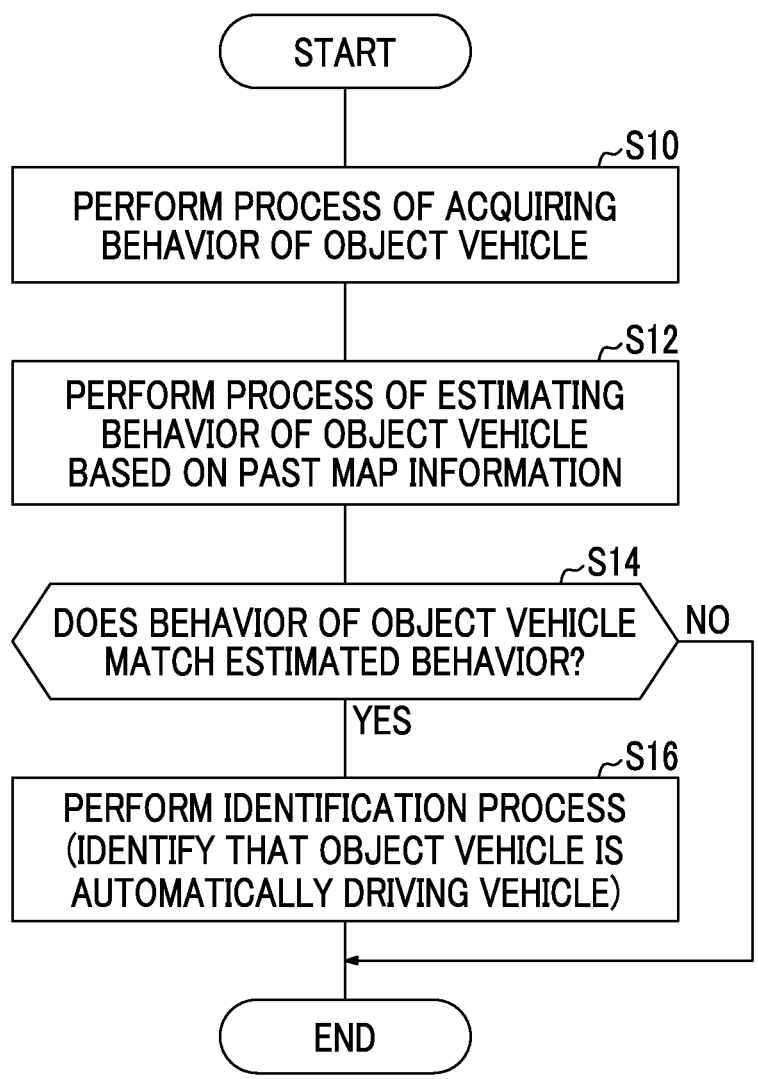
FIG. 2 is a flowchart illustrating an example of a vehicle identifying process which is performed using past map information.

FIG. 2 is a flowchart illustrating an example of a vehicle identifying process which is performed using past map information. The flowchart illustrated in FIG. 2 is performed by the vehicle identifying device 1, for example, at a time at which an operation of turning on a vehicle identifying function is received from a driver of the vehicle 2.

As illustrated in FIG. 2, the behavior acquiring unit 16 of the vehicle identifying device 1 acquires a behavior of a target vehicle based on the detection results from the external sensor 3 as a behavior acquiring process (S10). Subsequently, the behavior estimating unit 17 of the vehicle identifying device 1 estimates the behavior of the target vehicle in a case where the object vehicle is an automatically driven vehicle based on past map information as a behavior estimating process (S12).

Subsequently, the identification unit 18 of the vehicle identifying device 1 determines whether the behavior of the object vehicle acquired in the behavior acquiring process (S10) matches the behavior estimated in the behavior estimating process (S12) as a match determining process (S14).

When it is determined that the behavior of the object vehicle acquired in the behavior acquiring process (S10) matches the behavior estimated in the behavior estimating process (S12) (YES in S14), the identification unit 18 identifies that the object vehicle is an automatically driven vehicle as an identification process (S16).

When the identification process (S16) ends or when it is determined that the behavior of the object vehicle does not match the estimated behavior (NO in S14), the vehicle identifying device 1 ends the flowchart illustrated in FIG. 2. After the flowchart has ended, the vehicle identifying device 1 repeatedly performs the flowchart illustrated in FIG. 2 until ending conditions are satisfied.

By performing the flowchart illustrated in FIG. 2, it is possible to identify that the object vehicle is an automatically driven vehicle based on the past map information.

With the vehicle identifying device 1 according to this embodiment, it is possible to identify whether the object vehicle is an automatically driven vehicle based on the result of comparison between the measured behavior of the object vehicle and the behavior estimated based on the past map information. In this way, the vehicle identifying device 1 can identify that the object vehicle is an automatically driven vehicle using the past map information.

Second Embodiment

A vehicle identifying device 1A according to a second embodiment is different from the vehicle identifying device 1 according to the first embodiment in only some functions of the behavior estimating unit 17 and the identification unit 18, and other functions are the same as those of the first embodiment. Accordingly, the same description as in the first embodiment will not be repeated.

A behavior estimating unit 17A estimates a behavior of the target vehicle in a case where a target vehicle is an automatically driven vehicle using only current map information. More specifically, the behavior estimating unit 17A estimates the behavior of the target vehicle in a case where the object vehicle is an automatically driven vehicle using traffic rules included in the map information. The other functions of the behavior estimating unit 17A are the same as in the first embodiment, except that past map information is not used.

The identification unit 18A identifies whether the object vehicle is an automatically driven vehicle based on the result of comparison between the behavior of the object vehicle acquired by the behavior acquiring unit 16 and the behavior estimated by the behavior estimating unit 17A. For example, when the behavior is likely to faithfully observe traffic rules, the identification unit 18A determines that the object vehicle is an automatically driven vehicle. Examples of the "behavior which is likely to faithfully observe traffic rules" include not exceeding a speed limit, normally stopping at a stop line for a predetermined time, normally turning on a direction indicator for a predetermined time, and normally turning on the direction indicator at a predetermined position before a crossing. Such a behavior is a behavior unique to an automatically driven vehicle.

When it is determined that the behavior of the object vehicle acquired by the behavior acquiring unit 16 and the behavior estimated based on the traffic rules by the behavior estimating unit 17A match each other, the identification unit 18A identifies that the object vehicle is an automatically driven vehicle.

For example, the identification unit 18A may calculate a degree of matching by comparing information on driving such as an acceleration time, a deceleration time, a course, a speed, an acceleration, and an ON time of a direction indicator as an example of the comparison of behavior. The degree of matching is, for example, an index indicating that there are more similarities as it has a larger value. Then, the identification unit 18A may identify whether the object vehicle is an automatically driven vehicle based on the degree of matching. For example, when the degree of matching is equal to or greater than a predetermined value, the identification unit 18A can determine that the behavior of the object vehicle acquired by the behavior acquiring unit 16 and the behavior estimated based on the traffic rules by the behavior estimating unit 17A match each other. That is, matching includes a case in which the degree of matching is equal to or greater than a predetermined value as well as a case in which both match each other perfectly. The identification unit 18A may output the identification result to the HMI 9 or may be used for automatic driving. The other configuration is the same as in the first embodiment.

(Operation of Vehicle Identifying Device)

Figure 3:
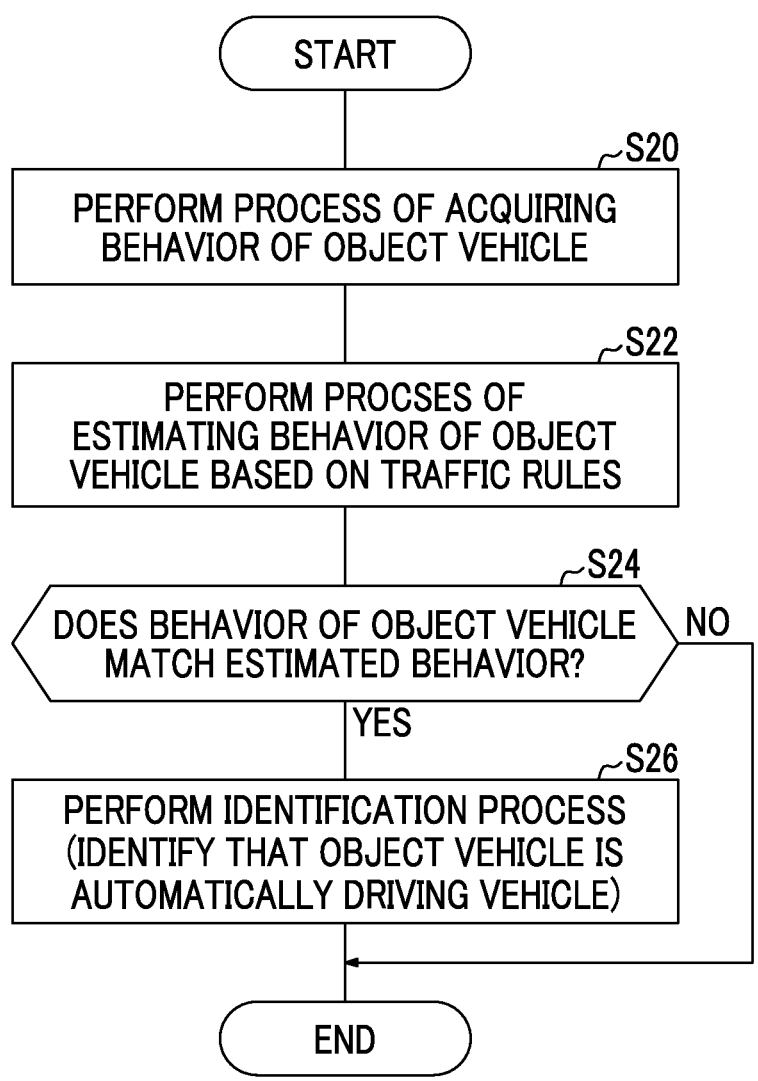
FIG. 3 is a flowchart illustrating an example of a vehicle identifying process which is performed using traffic rules.

FIG. 3 is a flowchart illustrating an example of a vehicle identifying process which is performed using traffic rules. The flowchart illustrated in FIG. 3 is performed by the vehicle identifying device 1A, for example, at a time at which an operation of turning on a vehicle identifying function is received from a driver of the vehicle 2.

As illustrated in FIG. 3, the behavior acquiring unit 16 of the vehicle identifying device 1A acquires a behavior of a target vehicle based on the detection results from the external sensor 3 as a behavior acquiring process (S20). Subsequently, the behavior estimating unit 17A of the vehicle identifying device 1A estimates the behavior of the target vehicle in a case where the target vehicle is an automatically driven vehicle based on map information including traffic rules as a behavior estimating process (S22).

Subsequently, the identification unit 18A of the vehicle identifying device 1A determines whether the behavior of the target vehicle acquired in the behavior acquiring process (S20) matches the behavior estimated in the behavior estimating process (S22) as a match determining process (S24).

When it is determined that the behavior of the target vehicle acquired in the behavior acquiring process (S20) matches the behavior estimated in the behavior estimating process (S22) (YES in S24), the identification unit 18A identifies that the target vehicle is an automatically driven vehicle as an identification process (S26).

When the identification process (S26) ends or when it is determined that the behavior of the target vehicle does not match the estimated behavior (NO in S24), the vehicle identifying device 1A ends the flowchart illustrated in FIG. 3. After the flowchart has ended, the vehicle identifying device 1A repeatedly performs the flowchart illustrated in FIG. 3 until ending conditions are satisfied.

By performing the flowchart illustrated in FIG. 3, it is possible to identify that the target vehicle is an automatically driven vehicle based on the traffic rules.

With the vehicle identifying device 1A according to this embodiment, it is possible to identify that the target vehicle is an automatically driven vehicle using the traffic rules on the premise that there is a likelihood that an automatically driven vehicle will exhibit a behavior of faithfully observing the traffic rules.

Third Embodiment

A vehicle identifying device 1B according to a third embodiment is different from the vehicle identifying device 1 according to the first embodiment in only some functions of the behavior estimating unit 17 and the identification unit 18, and other functions are the same as those of the first embodiment. Accordingly, the same description as in the first embodiment will not be repeated.

When a relative position relationship between a target vehicle and an object present around the target vehicle is constant, the behavior estimating unit 17B estimates that the object present around the target vehicle is an object which is recognizable by the target vehicle. The behavior estimating unit 17B calculates change of an acceleration (an acceleration of the target vehicle) over time in a relative direction between the target vehicle and the recognizable object. The relative direction is a direction which is determined by the position relationship between the target vehicle and the recognizable object. An example of the relative direction is a longitudinal direction when the recognizable object is present in front of the target vehicle, and is a lateral direction when the recognizable object is present beside the target vehicle.

The identification unit 18B determines whether the change of the acceleration in the relative direction over time varies discontinuously depending on the number of recognizable objects. When the change of the acceleration in the relative direction over time varies discontinuously depending on the number of recognizable objects, the identification unit 18B identifies that the target vehicle is an automatically driven vehicle. When the number of adjacent objects varies, an automatically driven vehicle exhibits a behavior of keeping a distance from the objects and thus is likely to exhibit discontinuous movement. This behavior is a behavior unique to an automatically driven vehicle.

(Operation of Vehicle Identifying Device)

Figure 4:
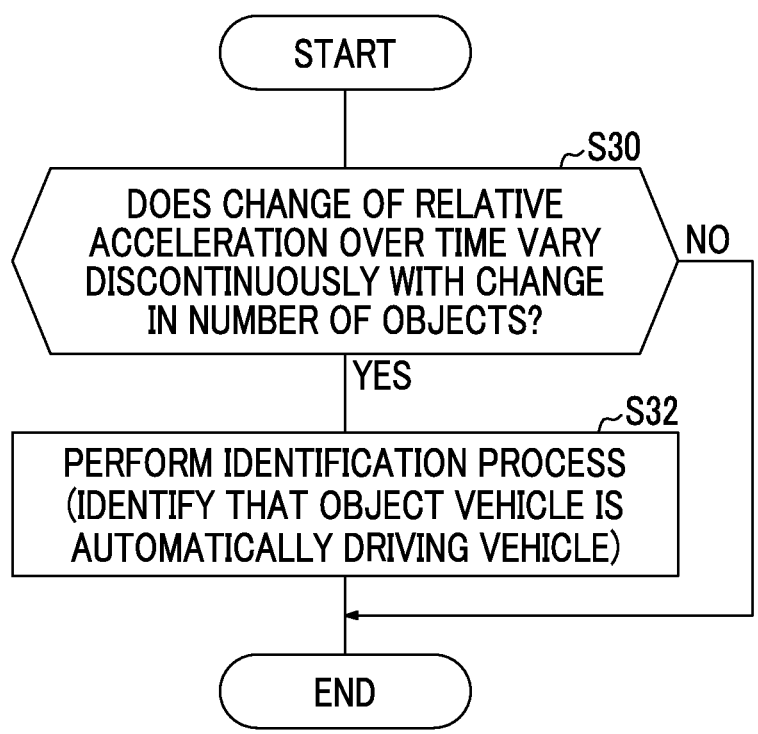
FIG. 4 is a flowchart illustrating an example of a vehicle identifying process which is performed using change of an acceleration in a relative direction over time.

FIG. 4 is a flowchart illustrating an example of a vehicle identifying process which is performed using change of an acceleration in a relative direction over time. The flowchart illustrated in FIG. 4 is performed by the vehicle identifying device 1B, for example, at a time at which an operation of turning on a vehicle identifying function is received from a driver of the vehicle 2.

As illustrated in FIG. 4, the behavior estimating unit 17B of the vehicle identifying device 1B calculates change of an acceleration in a relative direction over time as a determination process (S30). As the determination process (S30), the identification unit 18B of the vehicle identifying device 1B determines whether the change of the acceleration in the relative direction over time varies discontinuously depending on the number of recognizable objects (in other words, whether the change of the acceleration in the relative direction over time varies discontinuously with change in number of recognizable objects).

When it is determined that the change of the acceleration in the relative direction over time varies discontinuously depending on the number of recognizable objects (YES in S30), the identification unit 18B identifies that the target vehicle is an automatically driven vehicle as an identification process (S32).

When the identification process (S32) ends or when it is determined that the change of the acceleration in the relative direction over time does not vary discontinuously depending on the number of recognizable objects (NO in S32), the flowchart illustrated in FIG. 4 ends. After the flowchart has ended, the vehicle identifying device 1B repeatedly performs the flowchart illustrated in FIG. 4 until ending conditions are satisfied.

By performing the flowchart illustrated in FIG. 4, it is possible to identify that the target vehicle is an automatically driven vehicle based on the behavior unique to the automatically driven vehicle.

With the vehicle identifying device 1B according to this embodiment, it is possible to identify that the target vehicle is an automatically driven vehicle using the change of the acceleration in the relative direction over time on the premise that there is a likelihood that an automatically driven vehicle will exhibit a behavior of keeping a distance from an object.

The above-mentioned embodiments can be modified and improved in various forms based on knowledge of those skilled in the art. For example, determination may be performed in combination of the first embodiment, the second embodiment, and the third embodiment. For example, by expressing the identification results of the first embodiment, the second embodiment, and the third embodiment using scoring (which is 1 in the case of an automatically driven vehicle and is 0 otherwise) and determining weighted added values using a threshold value, combinations for determination of the embodiments can be determined.

What is claimed is:

1. A vehicle identifying device configured to identify whether a target vehicle around a vehicle is an autonomous vehicle, the vehicle identifying device comprising circuitry configured to:
   acquire a behavior of the target vehicle based on a detection result of an external sensor;
   estimate a behavior of the target vehicle based on map information that includes traffic rules; and
   identify that the target vehicle is an autonomously driven vehicle based on a determination that the acquired behavior of the target vehicle and the behavior estimated based on the traffic rules match each other,
   wherein the circuitry is configured to identify that the target vehicle is an autonomously driven vehicle based on determining that the target vehicle stops at a stop line for a predetermined time.

2. A vehicle identifying device configured to identify whether a target vehicle around a vehicle is an autonomous vehicle, the vehicle identifying device comprising circuitry to:
   acquire a behavior of the target vehicle based on a detection result of an external sensor;
   estimate a behavior of the target vehicle based on map information that includes traffic rules; and
   identify that the target vehicle is an autonomously driven vehicle based on a determination that the acquired behavior of the target vehicle and the behavior estimated based on the traffic rules match each other,
   wherein the circuitry is configured to identify that the target vehicle is an autonomously driven vehicle based on determining that the target vehicle turns on a direction indicator at a predetermined position before a crossing.

* * * * *